United States Patent [19]

Tsividis

[11] Patent Number: 4,873,661

[45] Date of Patent: Oct. 10, 1989

[54] SWITCHED NEURAL NETWORKS

[76] Inventor: Yannis Tsividis, 601 W. 113th St., New York, N.Y. 10025

[21] Appl. No.: 90,126

[22] Filed: Aug. 27, 1987

[51] Int. Cl.[4] .................... G06F 15/46; H03K 19/08
[52] U.S. Cl. ................................ 364/807; 307/201
[58] Field of Search ................. 307/201; 364/513, 807

[56] References Cited

U.S. PATENT DOCUMENTS

| | | | |
|---|---|---|---|
| 3,655,958 | 4/1972 | West | 364/807 X |
| 3,691,400 | 9/1972 | Askew | 307/201 |
| 4,719,591 | 1/1988 | Hopfield et al. | 364/807 X |

OTHER PUBLICATIONS

"Signal Processors with Transfer Function Coefficient Determined by Timing," IEEE Trans. Circuits and Systems, vol. CAS—29, Dec. 1982, pp. 807–817.
"Continuous-Time MOSFET-C Filters in VLSI," by Tsividis et al., IEEE Trans. Circuits and Systems, vol. CAS-33, Feb. 1986, pp. 125–139.
"Computing with Neural Circuits: A Model," Science vol. 233, Aug. 1986, pp. 625–633 by MOS Transistors.
"An Introduction to Computing with Neural Nets," IEEE ASSP Magazine, Apr. 1987, pp. 4–20.

*Primary Examiner*—Steven Mottola
*Attorney, Agent, or Firm*—Brumbaugh, Graves, Donohue & Raymond

[57] ABSTRACT

Discrete-time neural networks are implemented using switched capacitors, switches and inverters and advantage is taken of the inherent saturation of the inverters to implement the neuron non-linearity without additional elements.

7 Claims, 2 Drawing Sheets

SWITCHED NEURAL NETWORKS

This invention relates to semiconductive integrated circuits, more particularly of the kind useful as neural networks, for high speed signal processing and for artificial intelligence.

BACKGROUND OF THE INVENTION

There is increasing interest in computation circuits that operate at high speed with many inputs to provide artificial intelligence. Systems of integrated circuits of the kind particularly useful for employing associative memory to provide artificial intelligence, pattern recognition and optimization processes are now often described as neural networks. Such systems are characterized by the need for many thousands of components.

Systems of the kind needed for these tasks are still in the rudimentary stage and leave considerable room for improvement. In particular much of the effort hitherto has been on digital techniques. This increases the number of computating and processing operations because of the need to work with binary digits. Networks that operate on analog rather than digital signals offer considerable promise for more efficient operation.

Neural networks that have utilized analog processing have tended to use continuous signals because of the better availability of neural circuits for processing continuous analog signals. However, the use of discrete-time or analog samples offers greater promise for large networks because of easier simulation and control.

To this end, an object of the invention is a neural network that is made up of simple, readily available components that can readily be integrated on a large scale, and that can process analog signals on a discrete time basis.

SUMMARY OF THE INVENTION

A feature of the invention is the use of switched circuits including switched-capacitor circuits as a basic component of the neural network. Switched capacitor circuits are now playing an important role in analog signal processing in telecommunications, particularly for frequency filtering. The present invention extends their role to analog functions in neural networks. In particular, for use in neural networks their properties are advantageously combined with the non-linearities readily available in circuits using metal-oxide-semiconductor (MOS) transistors to provide switched-capacitor neural circuits or "neurons", and such switched capacitor neurons are assembled into neural networks.

DETAILED DESCRIPTION OF THE INVENTION

Figure 1:
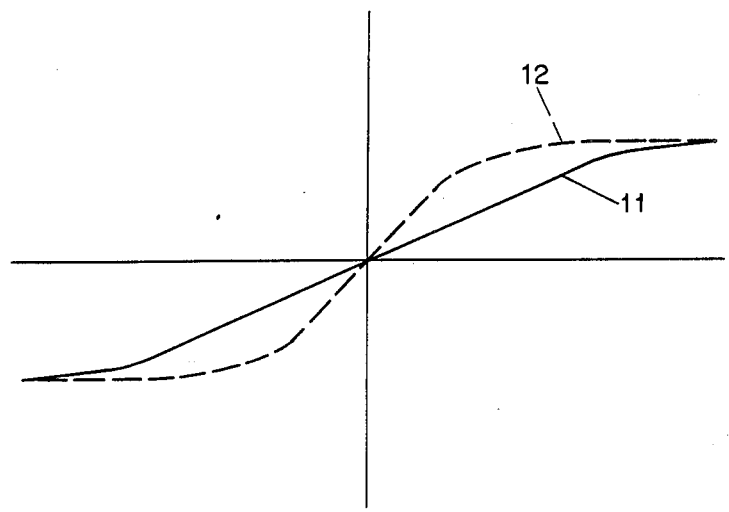
FIG. 1 shows input-output characteristics useful in explaining the invention.

Most current activity on neural networks, or nets, has placed little emphasis on the detail of individual neurons for use in the networks and more on the importance of network size and connectivity. For example, one current version of neural networks described in a paper by Lippman entitled "An Introduction To Computing With Neural Nets", IEEE ASSP Magazine April, 1987, pp. 4–20 is simply characterized by the following equations:

$$X_i(nT) = f\left[\sum_{j=1}^{N} W_{ij} x_j(nT - T)\right]$$

where $x_i(mT)$ is the output of the ith neuron at discrete instant mT, $W_{ij}$ are real numbers and the weighting factors of individual inputs, f [ ] represents a non-linearity, commonly of sigmoid shape, as shown in FIG. 1, and N is the total number of neurons. The above equation is a discrete-time equation and is discussed in detail in the earlier identified paper.

In FIG. 1, the solid line 11 shows the non-linearity in the input-output characteristic f [y] for a single neuron and the broken line shows the accented non-linearity of sigmoid shape desired of the input-output characteristic f [By] where B is amount by which each input is multiplied to accent the non-linearity.

Figure 2:
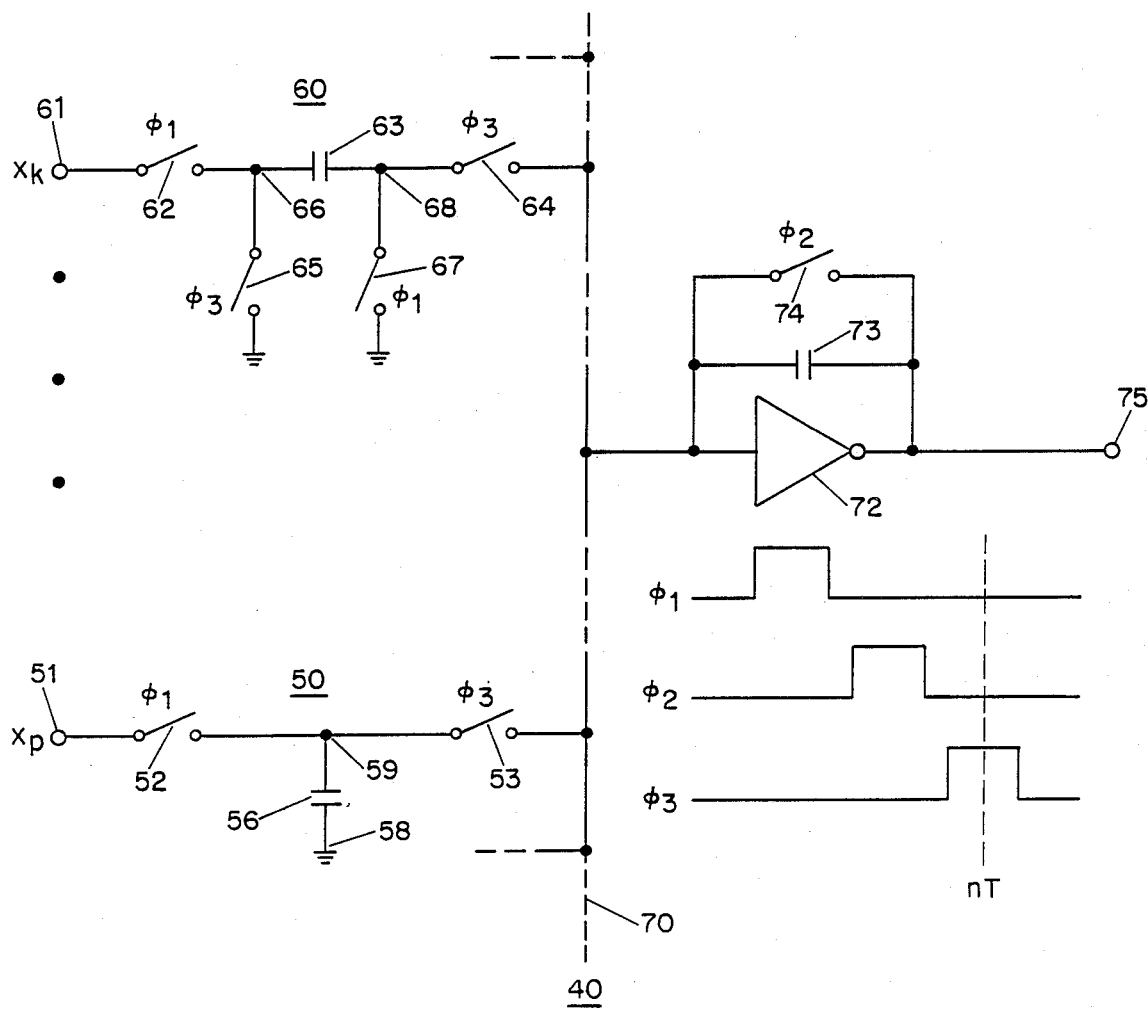
FIG. 2 is an illustrative embodiment of a switched-capacitor neuron useful in a neural network in accordance with the invention.

In FIG. 2, there is shown by way of example one form of neuron circuit 40 able to provide the desired sigmoid characteristic. It uses simply a collection of electronic switches, typically MOS transistors, capacitors, typically MOS capacitors, and an inverter, typically a CMOS device.

More particularly, neuron 40 includes a plurality of input branches of which two have been shown. Of these input branch 50 is representative of input branches that are designed to invert the polarity of the sample that is received at its input terminal 51 before it affects the output of the inverter 72. This input sample is generally the output of some other neuron, to which the neuron is to be connected.

Input branch 50 includes as coupling elements switches 52 and 53 and input capacitor 56. The switches 52 and 53 are serially connected between the input terminal 51 and the input bus 70 in which all the inputs are combined for application to the input of the inverter 72 that is the basic processing element of the neuron. The input capacitor 56 is connected between a point of reference potential, shown as ground 58, and the node 59 between switches 52 and 53. The input capacitor 56 is appropriately weighted in size both by the factor $W_{ip}$ that is dependent on the neuron from which the input is being supplied and by the factor B that is dependent on the neuron to which the input is being applied.

Input branch 60 is representative of the input branches in which the polarity of the sample that is being received at its input terminal is not inverted before it affects the output of inverter 70. It includes the input terminal 61 and the series arrangement of switch 62, capacitor 63 and switch 64 for coupling between the input terminal 61 and the input bus 70. Additionally, switch 65 is connected between ground and node 66 that is between switch 62 and capacitor 63, and switch 67 is connected between ground and node 68 between capacitor 63 and switch 64.

Additionally capacitor 73 is shown connected between the output and input terminals of inverter 72 in parallel with switch 74. The output terminal 75 of the neuron is the output of inverter 72.

As is indicated, each of switches 52 and 62 is closed when control signal $\phi_1$ is positive, switch 74 is closed when control signal $\phi_2$ is positive, and switches 53, 64 and 65 are closed when control signal $\phi_3$ is positive. The periodic pulse forms of the control signals $\phi_1$, $\phi_2$ and $\phi_3$ are as depicted. As previously mentioned, the switches are typically one or more MOS transistors that can be turned on or made conducting by means of appropriate gate voltages. The inverter 72 may be simply a complementary pair of MOS transistors whose gates are tied together and whose channels are serially connected, with the node between them serving a the output node. The inverter is designed to have a moderate to high gain in its linear region, typically centered around zero input, so that the input bus 70 supplying the input of the inverter may be considered a virtual ground.

The sizes of the individual capacitances are chosen to provide the corresponding weighting factors $BW_{lk}$ or $BW_{ip}$ in the above equation for the individual neurons being combined.

In operation when $\phi_1$ is high so that only switches 51, 62 and 67 are closed, samples of the values of the various inputs are stored in the corresponding input capacitors 56 and 63. While these capacitors are holding these values, $\phi_2$ goes high, shorting the input and output terminals of inverter 72, and the input end of the inverter 72 is zeroed. When $\phi_3$ goes high, the input capacitors 56 and 58 are switched to virtual ground, transferring the charge on their right-hand plate to the left hand plate of capacitor 73. It can be appreciated that an input applied to terminal 56 will be inverted by the time it affects the output of the inverter and that the input applied to terminal 61 will not be inverted. As long as the inverter operates in its linear region, charge conservation dictates that the output $x_i$ is given by the sum inside the brackets in the above equation, multiplied by B times the weighting factor of the capacitors. If the value of this quantity exceeds the saturation limits of the inverter, non-linearity takes over and the sigmoid function f[ ] is automatically implemented. The gain of the can be set large enough by choosing B appropriately.

Various modifications are possible in this specific circuit described. To allow for real-time programming, the individual capacitors can be replaced by binary-weighted capacitor arrays.

An alternative way to achieve programmability using switches and capacitors is to employ neurons with voltage-controlled interconnection values or weightings and to store the required control voltages on capacitors. These values may have to be periodically altered, as required by the programming, and/or refreshed to compensate for leakage of charge on the capacitor plates through parasitic conductive paths (e.g. the PN junctions of the switches). A voltage-controlled neuron can be realized for example, by replacing the resistors in the neuron described by Hopfield and Tank in a paper entitled "Computing With Neural Circuits: A Model", Science Vol. 233, Aug. 1986, pp. 625-633 by MOS Transistors, as is done for filters and including nonlinearity cancellation if desired.

The latter is described for example in a paper entitled "Continuous-Time MOSFET-C Filters in VLSI" by Tsividis, Banu and Khoury, IEEE Trans. Circuits and Systems, Vol. CAS-33 Feb. 1986, pp. 125-139. In such usage, the value of the gate voltage of MOS transistors controls their conduction, and hence the value of the interconnection resistance. Current-controlled neurons, such as transconductance amplifiers can also be used, by converting them from current-controlled to voltage-controlled, using for example, a voltage-controlled current source that can be a single transistor. The interconnection values can be tuned accurately if needed, using, for example, one of the tuning techniques outlined in the last-mentioned paper. One or more tuning systems can tune all interconnections, possibly on a time-shared basis. The use of timing-controlled interconnections is also possible, as proposed for example, for signal processors by Tsividis "Signal Processors With Transfer Function Coefficient Determined by Timing", IEEE Trans. Circuits and Systems, Vol. CAS-29, Dec. 1982, pp. 807-817. These approaches can be applied to both continuous-time and discrete-time neurons.

Additionally, a two-phase variation of the circuit described is possible if the parallel path including switch 74 is omitted, in which case the input of the inverter is not rezeroed each cycle before receiving the next input sample. In this latter case, some modification of the equation set forth above, may be appropriate to accommodate any acumulation of charge on capacitor 73.

Figure 3:
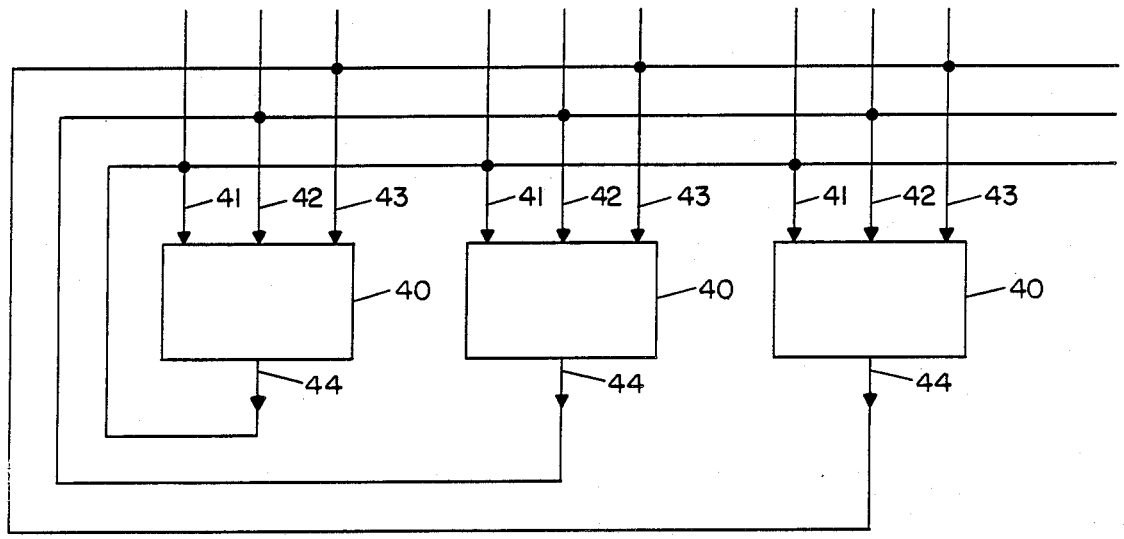
FIG. 3 shows in block schematic a simple form of neural network in which may be used neurons of the kind shown in FIG. 1.

In FIG. 3, there is shown a neural network made up of three neurons 40 of the kind described in FIG. 2. each neuron 40 is shown provided with three input terminals 41, 42, 43 and one output terminal 44. Each output is applied as an input to each of the three neurons to provide connectivity between the three neurons. In a complete network, many neurons would be included and the connectivity between neurons could be selective, depending on the task to be performed by a particular neuron in the network.

Typically stable states can be programmed into the network using a wide variety of rules, many of which are set forth in the aforementioned paper to determine the weights $W_{ij}$ needed for the individual capacitors.

The implementation of the above equation in the manner described has a number of advantages.

First, it implements directly discrete-time neural networks, which may have interesting properties of their own and are much easier to analyze by programming the above equation on a computer.

Second, no loop is ever closed so that there is never any continuous-time feedback nor the possibility of unwanted continuous-time oscillations.

Third, the discrete-time implementation of the neurons may allow for reducing the number of interconnections at a tolerable expense in speed. This can be done by implementing the interconnections between certain neurons indirectly, i.e. through other neurons that handle traffic as well as functioning as neurons themselves on a time-shared basis. The sample value of a neuron can be temporarily stored on a capacitor while this neuron is handling traffic between other neurons, or between neurons and interconnection tuning systems.

What is claimed:

1. A neural network including a plurality of neurons, each comprising non-linear amplifying means including input means and an output terminal, the output terminal of each being connected to the input means of other amplifying means of the plurality for supplying its output as an input to said other amplifying means, each of said neurons being characterized by the inclusion of capacitor means and switching means in said input means for storing an input signal for sampling and for weighting.

2. A neural network in accordance with claim 1 further characterized in that the input means of each of the amplifying means comprises a plurality of input terminals each for receiving an input signal, an input bus, and a separate coupling means between each input signal terminal and the input bus, some of said coupling means being inverting and others of said coupling means being non-inverting.

3. A neural network in accordance with claim 2 further characterized in that each inverting coupling means comprise a pair of switches serially connected between an input terminal and an input bus, and capacitor means connected between a node between the two switches and a point of reference potential, the two switches being adapted to be closed sequentially, in non-overlapping intervals.

4. The neural network of claim 2 in which each non-inverting coupling means comprises a first switch, capacitor means, and a second switch serially connected between an input terminal and an input bus, a third switch connected between a node between the first switch and the capacitor means and a point of reference potential, and a fourth switch connected between a node between the capacitor means and the second switch and a point at said reference potential, the first and fourth switches being adapted to be closed synchronously, the second and third switches being adapted to be closed synchronously, subsequent to the closing of the first and fourth switches, in non-overlapping intervals.

5. The neural network of claim 2 in which each non-inverting coupling means comprises a first switch, capacitor means and a second switch serially connected between an input terminal and an input bus, a third switch connected between a node between the first switch and the capacitor means and a point of reference potential, and a fourth switch connected between a node between the capacitor means and the second switch and a point of said reference potential, and each inverting coupling means comprises fifth and sixth switches serially connected between an input terminal and the input bus and a second capacitor means connected between a node between the fifth and sixth switches and a point at said reference potential, the first, fourth, and fifth switches each being adapted to be closed for a first interval, and the second, third and sixth being adapted to be closed for a second interval, non-overlapping with the first interval.

6. The neural network of claim 5 in which the amplifying means include a third capacitance means in parallel with a seventh switch connected between the input and output of the amplifying means, the seventh switch being adapted to be closed at a third interval spaced between and non-overlapping said first and second intervals.

7. The neural network of claim 6 in which the first and second capacitor means are adapted for weighting input signals applied to their associated input terminals.

* * * * *